May 18, 1948. F. W. BUSCH ET AL 2,441,916
STEAM SEPARATOR FOR STEAM IRONS
Filed Sept. 16, 1946 2 Sheets-Sheet 2

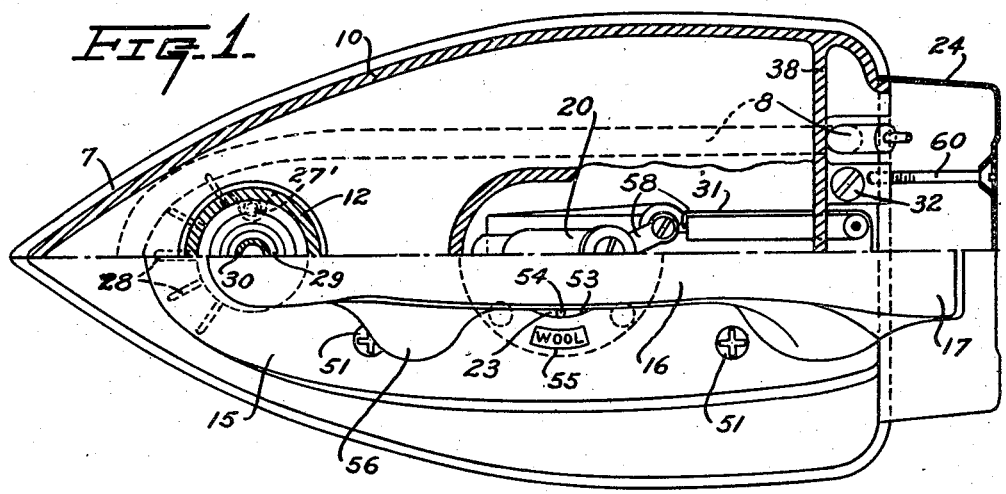

INVENTORS
F. W. Busch
C. H. Drewes
BY Lieber & Lieber
ATTORNEYS.

Patented May 18, 1948

2,441,916

UNITED STATES PATENT OFFICE 2,441,916

STEAM SEPARATOR FOR STEAM IRONS

Fred W. Busch and Charles H. Drewes, Milwaukee, Wis., assignors to Milsteel Products Co., Milwaukee, Wis., a corporation of Wisconsin Application September 16, 1946, Serial No. 697,178

6 Claims. (Cl. 38—77)

Our present invention relates in general to improvements in the art of manufacturing flatirons and the like, and relates more especially to improvements in the construction and operation of electrically heated steam emitting irons primarily intended for household use.

The primary object of our invention is to provide a simple but reliable electric steam iron, which is durable in construction and safely operable by a novice, and which may also be manufactured and sold at moderate cost for diverse uses.

Many different types of steam emitting electrically heated flatirons have heretofore been proposed, and several have been marketed with some success, but all of these prior proposals are more or less objectionable for various reasons. Most of the prior steam electric irons are too complicated in structure, unreliable and dangerous in operation, and too heavy and hard to manipulate, thus making them unsuitable for ordinary household use; and the prior flatirons of this kind are also relatively costly and difficult to assemble, adjust, and dismantle. For these and various other reasons, the prior commercial electrically heated steam irons have not proven highly popular with the trade, in spite of the fact that steaming of the articles being ironed is recognized as being exceedingly desirable.

It is therefore a more specific object of our invention to provide an improved electrically heated steam emitting flatiron which obviates the more serious difficulties and objections inherent in prior irons of this type, and which insures a uniform flow of relatively dry steam to the ironing surfaces under varying conditions of operation and use.

Another specific object of the present invention is to provide a simplified steam electric iron assemblage which is light and easy to manipulate, and wherein the regulating and control mechanisms are concealed and amply protected while still being readily adjustable for most efficient operation.

A further specific object of this invention is to provide an improved steam iron, which is safely operable by a novice, and in which the operator is well protected against possible burning or scalding, while the articles being pressed are also protected against damage due to lack of sufficient moisture and possible delivery of excess quantities of liquid.

Still another specific object of the invention is to provide an improved electrically heated garment steaming flatiron in which the electrical equipment is thoroughly protected against moisture, and which may be readily supplied with fresh liquid or emptied without danger, while all parts are readily accessible for inspection and cleaning.

An additional specific object of our invention is to provide an improved steam emitting electrically heated ironing unit, wherein the steam is most effectively generated and delivered to the work in proper condition, and which comprises relatively few simple and sturdy parts adapted to be manufactured in quantity at moderate cost.

Another specific object of our present invention is to provide an attractive and compact steam electric iron which may be conveniently adjusted to meet various operating conditions, and which is equipped with thermostatic control mechanism adapted to safeguard the user while being constantly ready for normal use.

These and other specific objects and advantages of the invention will be apparent from the following detailed description.

A clear conception of the numerous features constituting our present improvement, and of the mode of constructing and utilizing a typical electric steam iron embodying the invention, may be had by referring to the drawings accompanying and forming a part of this specification wherein like reference characters designate the same or similar parts in the various views.

Fig. 1 is a part sectional top view of one of the improved steam-electric ironing units, the section having been taken approximately along the irregular line 1—1 of Fig. 2, and a portion of the steam generating casing or body having been broken away in order to reveal some normally hidden parts;

Fig. 2 is a central vertical longitudinal section through all but the manipulating handle of the ironing unit of Fig. 1;

Figure 5:
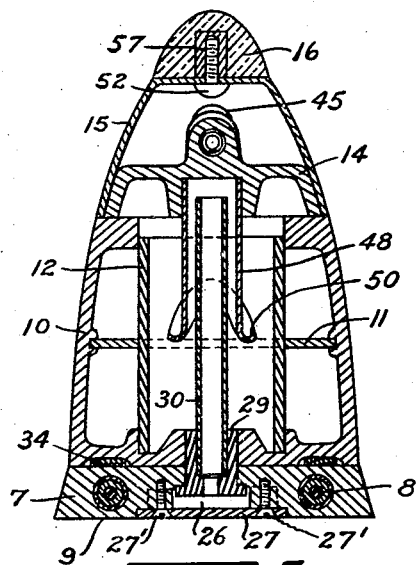
Fig. 5 is another transverse vertical section through the same assemblage, taken along the line 5—5 of Fig. 2 and viewed in the direction of the arrow.

While the invention has been shown and described herein as being especially and advantageously applicable to an electrically heated steam emitting flatiron for household use, it is not our desire or intent to unnecessarily restrict the scope or utility of the improved features by virtue of this limited embodiment.

Referring to the drawings, the typical electric steam iron shown therein, comprises in general a shoe or sole plate 7 having an electric heating element 8 embedded therein and being provided with a flat work engaging bottom surface 9; a main casing or hollow body 10 detachably secured to the top of the sole plate 7 and having therein a horizontal baffle plate 11 and an upright steam expansion chamber 12; an upper plate or cover 14 secured to the top of the body 10 and cooperating with the body, chamber and sole plate to provide ample steam conducting and emitting passages leading from the interior of the casing 10 to the work; an upper closure shell 15 removably secured to the cover plate 14 and normally concealing the latter; a manipulating handle 16 detachably secured to the top of the shell 15 and being provided with a rear projection or heel 17, and with a rear cable guard 18 for introducing the electrical conductors 19 into the ironing unit; a heat regulating thermostat 20 mounted upon the sole plate 7 beneath the body 10 and having an actuating stem 21 extending upwardly through a central conduit 22 formed in the body, and being provided at its upper end with a control knob or dial 23 journalled for rotation upon the top plate 14 beneath the cover shell 15; and a rear cap 24 removably attached to the body 10 and coacting with the sole plate 7 and cover 15 to normally conceal the electrical connectors which connect the heating element 8 and the thermostat 20 with the conductors 19.

Figure 3:
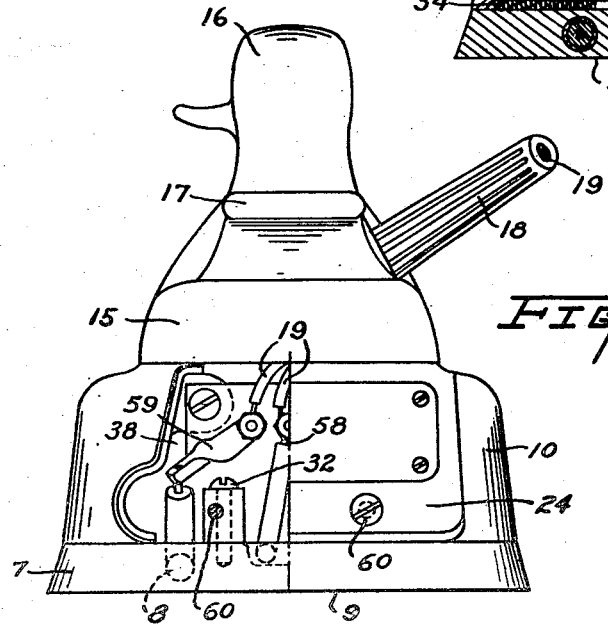
Fig. 3 is a rear end view of the improved ironing unit, with a portion of the rear end plate or cover broken away so as to reveal some of the electrical connections.

The sole plate 7 may be constructed of any suitable material adapted to be heated and to retain the heat, and the electric heating element 8 may be embedded within the sole plate 7 when the latter is being cast. The front portion of the sole plate 7 is provided with a steam superheating and distribution chamber or cavity 26 which is normally sealed by a disc 27 held in place by two screws 27', and the heating element 8 passes in close proximity to the opposite sides of this cavity 26 and around the forward portion thereof. A series of steam delivery passages 28 extend through the sole plate 7 radially and forwardly of the chamber 26, and terminate at the lower surface 9 of the plate; and a bushing 29 which is threaded into the body 10 and is accessible through the cavity 26 when the disc 27 has been removed, supports an upright steam conducting pipe 30 disposed centrally of the steam chamber 12, and also serves to firmly and detachably secure the front portion of the sole plate 7 to the main casing or body 10, see Figs. 1, 2 and 5. The rear portion of the sole plate 7 is provided with a central elongated recess 31 for receiving electrical conductors, and is also firmly but detachably secured to the body 10 by two screws 32, see Figs. 1, 2 and 3.

Figure 4:
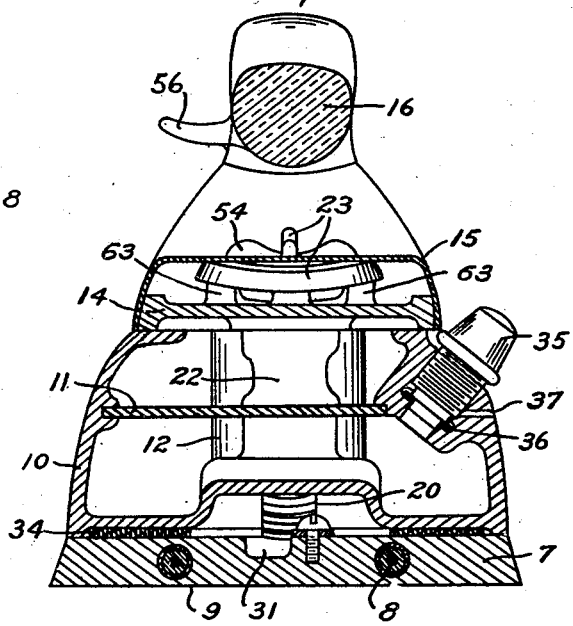
Fig. 4 is a transverse vertical section through the unit of Fig. 2, taken along the line 4—4 and looking in the direction of the arrows.

A sheet 34 of heat insulating material such as asbestos of proper thickness, is applied to the major area between the sole plate 7 and body 10, but not beneath the steam chamber 12; and the interior of the hollow body 10 provides a liquid storage chamber to which fresh liquid may be admitted beneath the shelf or baffle plate 11, past a removable filling plug 35, see Figs. 2 and 4. This plug 35 coacts with a sealing gasket 36 and with a pressure relief port 37 formed in the body 10, in such a manner as to normally seal the liquid confining chamber, but to also release steam pressure therefrom before the plug has been entirely removed, thus preventing steam or hot liquid from squirting through the plug opening onto the operator's hand. The baffle plate 11 may be secured within the body 10 during formation of the latter by casting, and extends longitudinally within the liquid storage chamber from the front of the body to a point beyond the filling opening, but spaced some distance from the rear body wall 38, see Fig. 2. With this relative disposition of the plate 11 and filling opening, the liquid is confined beneath the baffle when the iron is in horizontal position, but any steam or vapor generated within the body 10 is free to escape past the rear end of the baffle plate 11 into the steam chamber or zone above the plate 11. This space may if desired be filled with metal wool or other filtering material.

The conduit 22 is formed integral with the medial portion of the body 10 and the tubular steam expansion chamber 12 should be firmly secured within the body so as to seal the joints at the opposite end of the tube and between the plate 11 and the mid-portion of the chamber 12. The upper front portion of the body casing 10 directly in back of the chamber 12, is provided with a tapered steam and vapor outlet opening 39 which communicates with a downwardly open pocket 40 formed in the cover plate 14, and this cover may be formed by casting, and is firmly but detachably secured to the body 10 by means of screws 42. The recess or pocket 40 is provided with a passage communicating with an adjustable spring-pressed safety relief valve 43, which permits escape of abnormally high pressure through a port 44, and is adjustable with the aid of a screw 45; and a horizontal perforated strainer tube 46 is disposed within the pocket 40 above the opening 39 and has one end in open communication with the upper end of the expansion chamber 12, while its opposite end is normally sealed by a clean-out plug 47. The top plate or cover 14 also carries a separator tube 48 which extends downwardly into the chamber 12 coaxially of the upright steam outlet pipe 30, and the lower end of this tube 48 is provided with a flange 50 formed to direct any liquid which may be separated from the steam admitted to the chamber 12 from the pocket 40, toward the hot bottom of the expansion chamber, while the pipe 30 preferably extends upwardly some distance above the top of the chamber 12 within the tube 48.

The upper closure shell 15 which normally encloses and conceals the plate 14, may be formed of sheet-metal or other suitable sheet-like material, and is firmly but removably attached to the plate 14 with its lower edge in close proximity to the top of the body 10, by means of several screws 51, see Figs. 1 and 2. The manipulating handle 16 which may be formed of plastic, wood or other non-heat conducting material, is firmly but detachably secured to the top of the shell 15 by means of other attaching screws 52, and such attachment should be effected before the cover shell is secured to the top plate 14. The cover shell 15 is provided beneath the grip portion of the handle 16, with a central opening 53 through which the manipulating projections 54 of the dial 23 extend, and also has a window 55 formed therein adjacent to the opening 53 as shown in Fig. 1. The rear end of the handle 16 has an integral heel 17 as previously indicated, for the purpose of supporting the iron on end when not in use, and the forward portion of the handle 16 may be provided with an integral thumb rest 56 as shown. The handle attaching screws 52 may be caused to coact with metal bushings 57 embedded in the plastic or wood; and the cable guard 18 which is formed of rubber or the like, pierces the rear side portion of the handle 16 and provides a conduit communicating with a rear pocket formed in the handle.

The heat regulating thermostat 20 which is mounted upon the sole plate 7 beneath the body 10, may be of any well known construction adapted to maintain the ironing shoe at a predetermined temperature in accordance with adjustments effected by the dial 23, and this thermostat 20 is also operable as a switch to start and stop the flow of current through the heating element 8. The thermostat 20 is therefore connected in series with one of the electrical conductors 19 and with one of the rearwardly protruding ends of the element 8, by means of connections 58, and the other protruding end of the element 8 is connected to the other conductor 19 by a connection 59. These connections 58, 59 are normally concealed by the removable sheet metal cap 24 which is detachably secured to the body 10 by screws 60 and cooperates with the handle heel 17 to provide an end rest for the iron; and the thermostat actuating shaft 21 is housed within the body conduit 21 and has its lower end detachably associated with the thermostat 20 as shown in Fig. 2.

The upper end of the thermostat actuating shaft 21 is journalled for rotation in a bearing 61 secured to the top of the body 10 and having an upper flange clampingly engaging the mid-portion of the top plate 14, and the extreme upper end of the shaft 21 is serrated for the reception of a crank 62 which is angularly adjustable about the shaft 21 and has an eccentric pin coacting with a recess in the dial 23, as shown in Fig. 2. The dial 23 is provided with an annular series of indicia designating off position and various materials which may be safely ironed upon proper setting of the dial, and is guided for rotation by lugs 63 projecting upwardly from the top plate 14 while being held within the opening 53 of the shell 15 by a compression spring 64 interposed between the dial and the top of the shaft 21. This assemblage of elements permits ready assembly and dismantling of the dial 23 and shaft 21, while permitting accurate initial positioning of the dial, and the spring 64 also compensates for expansion and contraction and for slight misalignment of parts.

When the various parts of the portable steam electric ironing unit have been properly constructed, assembled and adjusted, the conductors 19 may be connected to a suitable source of electric current, and after the interior of the hollow body has been supplied with pure water upon removal of the filler plug 35 and proper reinsertion thereof, the iron is ready for normal use. Depending upon the nature of the goods to be ironed, the dial 23 should be set to suit the work, and the thermostat 20 will then function to regulate the temperature of the sole plate 7 as determined by the heating element 8, so as to properly perform the desired ironing. As the sole plate and the adjoining structure reach the predetermined temperature, liquid from within the body 10 beneath the partition plate 11 will be converted into vapor or steam, which after passing through the space above the plate 11 and through any filtering material confined therein, passes through the opening 39 and pocket 40 and through the perforated tube 46 into the upper end of the expansion chamber 12.

Any entrained moisture thus delivered into the chamber 12 will flow downwardly, either along the internal surface of the tubular chamber 12, or along the outer wall of the separator tube 48 and the flange 50 thereof, and will eventually come in contact with the hot bottom of the expansion chamber thus being quickly converted into steam. The steam thus generated together with the relatively dry steam from which the excess moisture has been separated, then flows upwardly through the tube 48 and downwardly through the pipe 30 and fitting 29, into the distributing cavity 26 formed in the sole plate 7. Since this cavity 26 is substantially surrounded by the heating element 8, it is quite hot and thus slightly superheats the dry steam flowing therethrough, and the superheated steam is thereafter delivered forwardly and in fan like formation against the work engaging the surface 9, through the radial downwardly directed passages 28.

When a piece of work has been ironed, the flatiron may be set on end and will be supported in approximately upright position by the rear heel 17 of the handle 16 and by the rear cap 24. These supports will not only support the assemblage in stable condition, but will prevent excessive heat from reaching the supporting surface, and during such positioning of the iron, the liquid within the hollow body 10 will flow against the end wall 38 and accumulated steam will continue to flow out through the passages 28 until all internal pressure is spent. When the iron is set on end and the energizing current is shutoff, any liquid resulting from steam which condenses within the chamber 12 will flow from within the chamber through the perforated tube 46 into the pocket 40 from which it will drain back into the hollow body 10 through the tapered opening 39, when the iron is again righted for normal use. In case the tube 46 or other passages should become clogged so as to abnormally increase the internal steam pressure, the safety release valve 43 will become quickly effective to automatically release the excess pressure through the port 44, and the closure shell 15 effectively prevents this hot steam from reaching the operator and also prevents the handle 16 and dial 23 from becoming undesirably hot. The port 37 located beneath the filler plug 35 also protects the user from possible scalding due to accumulations of steam within the body 10 when refilling becomes necessary, thus providing utmost safety for the operator.

From the foregoing detailed description it will be apparent that our present invention provides an improved electrically heated steam iron which besides being simple, compact and durable in construction, is also highly efficient in operation and flexible in its adaptations. The relatively simple main parts of the improved flatiron, may be readily firmly assembled with the aid of a screw driver, to attach the sole plate 7 to the body 10, the top plate 14 and end cap 24 to the body 10, the handle 16 to the cover shell 15, and the shell 15 to the top plate 14; and these several elements may be just as readily dismantled so as to permit inspection and cleaning of the various internal parts. The safety valve 43 may be set by manipulating the screw 45 upon removal of the shell 15, and the interior of the perforated tube 46 is freely accessible upon removal of the plug 47; and the electrical connections are all freely accessible upon removal of the end cap 24 which may be effected by withdrawing the screws 60. The chamber 12, pipe 30, and perforated tube 46 may all be formed from lengths of standard tubing, and by embedding the heating element 8 within the shoe and the baffle plate 11 within the body 10 during casting of these parts, the cost of construction is also reduced to a minimum. The thermostat 20 and the electrical connections while being concealed and protected, are still readily accessible, and these electrical parts are all thoroughly segregated from the liquid confining chamber formed within the body 10. The splash plate 11 which is confined within the body 10 serves to prevent excess moisture from reaching the steam expansion chamber 12, and also prevents excessive splashing of the liquid during normal fore and aft movement of the iron, and the expansion chamber 12 most effectively cooperates with the separator tube 48 so as to prevent free liquid from reaching the goods being ironed. The super-heating cavity 26 also cooperates with the expansion chamber 12 so as to insure delivery of dry steam only from the passages 28, and the dial 23 permits setting of the thermostat with utmost ease so as to insure reliable performance of the flatiron.

By forming the body 10 and the top plate 14 of aluminum, and by constructing the handle 16 and dial 23 of light but durable plastic, and the shell 15 and cap 24 of sheet metal, an exceptionally light but strong unit results. The entire assemblage may be manufactured and sold at moderate cost, and is extremely flexible in its adaptations and reliable in operation.

It should be understood that it is not desired to limit this invention to the exact details of construction or to the precise mode of operation, herein shown and described, for various modifications within the scope of the appended claims may occur to persons skilled in the art. It is also to be understood that the various descriptive terms used herein should be given the broadest interpretation consistent with the prior art.

We claim:

1. In an electric steam iron, a sole plate having an electric heating element associated therewith and being provided with a steam distribution cavity near its forward portion, a liquid confining casing resting upon said plate, means forming a steam expansion chamber within said casing above said cavity, a top closure for said casing having a pocket therein in open communication with the liquid space of said casing, a member spanning said pocket and having passage means in fluid communication with said chamber and including restricted passages in fluid communication with the liquid space of said casing through said pocket, and a riser pipe connecting said cavity with the upper portion of said chamber.

2. In an electric steam iron, a sole plate having an electric heating element associated therewith and being provided with a steam distribution cavity near its forward portion, a liquid confining casing resting upon said plate, means forming a steam expansion chamber within said casing above said cavity, a top closure for said casing having a pocket therein in open communication with the liquid space of said casing, a member spanning said pocket and having passage means in fluid communication with said chamber and including restricted passages in fluid communication with the liquid space of said casing through said pocket, a riser pipe connecting said cavity with the upper portion of said chamber, and a separator tube suspended from said closure and depending into said chamber around the upper end of said riser pipe.

3. In an electric steam iron, a sole plate having an electric heating element associated therewith and being provided with a steam distribution cavity near its forward portion, a liquid confining casing resting upon said plate, means forming a steam expansion chamber within said casing above said cavity, a top closure for said casing having a pocket therein in open communication with the liquid space of said casing, a perforated tubular member spanning said pocket and having an internal passage in fluid communication with said expansion chamber, said member also having restricted passages therein connecting said internal passage with the liquid space of said casing through said pocket, and a riser pipe connecting said cavity with the upper portion of said chamber remote from said member.

4. In an electric steam iron, a sole plate having an electric heating element associated therewith and being provided with a steam distribution cavity near its forward portion, a liquid confining casing resting upon said plate, means forming a steam expansion chamber within said casing above said cavity, a top closure for said casing having a pocket therein in open communication with the liquid space of said casing, a perforated tubular member spanning said pocket and having an internal passage in fluid communication with said expansion chamber, said member also having restricted passages therein connecting said internal passage with the liquid space of said casing through said pocket, a riser pipe connecting said cavity with the upper portion of said chamber, and a separator tube suspended from said closure and depending into said chamber to form an apron surrounding the upper end of said riser pipe.

5. In an electric steam iron, a sole plate having an electric heating element associated therewith and being provided with a steam distribution cavity near its forward portion, a main liquid confining casing resting upon said plate, an auxiliary casing forming a steam expansion chamber within said main casing above said cavity, a top closure for both of said casings having a pocket therein in open communication with the liquid space in said main casing, a steam filtering member spanning said pocket and having passage means in fluid communication with said expansion chamber and including restricted passages in fluid communication with the liquid space of said main casing through said pocket, a riser pipe connecting said cavity with the upper portion of said chamber remote from said member, and a separator apron suspended from said closure and depending into said chamber between the upper end of said riser pipe and said filtering member.

6. In a steam separator for a steam iron, a sole plate having a heater associated therewith and being provided with a steam distribution cavity near its forward portion, a main liquid confining casing resting upon said plate, an auxiliary casing forming a steam expansion chamber within said main casing above said cavity, a top closure for both of said casings, a steam filtering member confined within said top closure and having passage means in fluid communication with said expansion chamber and including restricted passages in direct fluid communication with the liquid space of said main casing, a riser pipe connecting said cavity with the upper portion of said expansion chamber, and a separator apron suspended from said closure and depending into said expansion chamber between the upper end of said riser pipe and said filtering member.

FRED W. BUSCH.
CHARLES H. DREWES.

REFERENCES CITED

The following references are of record in the file of this patent:

UNITED STATES PATENTS

| Number | Name | Date |
|---|---|---|
| 1,521,093 | Hall | Dec. 30, 1924 |
| 1,962,940 | Schaefer | June 12, 1934 |
| 2,073,657 | Stockton | Mar. 16, 1937 |
| 2,179,259 | Jones | Nov. 7, 1939 |
| 2,188,010 | Miller | Jan. 23, 1940 |
| 2,189,709 | Deems | Feb. 6, 1940 |
| 2,198,924 | Smith | Apr. 30, 1940 |
| 2,233,048 | Eckstein | Feb. 25, 1941 |
| 2,254,851 | Miller | Sept. 2, 1941 |
| 2,309,427 | Wolcott | Jan. 26, 1943 |
| 2,311,164 | Ekstedt | Feb. 16, 1943 |
| 2,313,382 | Kistner | Mar. 9, 1943 |
| 2,337,077 | Woodman | Dec. 21, 1943 |
| 2,368,048 | Stone | Jan. 23, 1945 |
| 2,369,677 | Lucia | Feb. 20, 1945 |
| 2,411,738 | Lucia et al. | Nov. 26, 1946 |
| 2,419,705 | Busch et al. | Apr. 29, 1947 |

FOREIGN PATENTS

| Number | Country | Date |
|---|---|---|
| 330,870 | Great Britain | June 19, 1930 |
| 474,204 | Great Britain | Oct. 27, 1937 |